United States Patent
Xu et al.

(10) Patent No.: US 10,958,345 B1
(45) Date of Patent: Mar. 23, 2021

(54) ECHO CANCELLATION SYSTEM AND METHOD

(71) Applicant: CABLE TELEVISION LABORATORIES, INC., Louisville, CO (US)

(72) Inventors: Mu Xu, Broomfield, CO (US); Zhensheng Jia, Superior, CO (US); Junwen Zhang, Broomfield, CO (US); Haipeng Zhang, Broomfield, CO (US); Luis Alberto Campos, Superior, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 0 days.

(21) Appl. No.: 16/869,265

(22) Filed: May 7, 2020

Related U.S. Application Data

(60) Provisional application No. 62/957,615, filed on Jan. 6, 2020, provisional application No. 62/844,379, filed on May 7, 2019.

(51) Int. Cl.
| | |
|---|---|
| *H04B 10/2507* | (2013.01) |
| *H04B 10/69* | (2013.01) |
| *H04Q 11/00* | (2006.01) |
| *H04B 10/40* | (2013.01) |

(52) U.S. Cl.
CPC ......... *H04B 10/2572* (2013.01); *H04B 10/40* (2013.01); *H04B 10/6971* (2013.01); *H04Q 11/0067* (2013.01); *H04Q 2213/1319* (2013.01)

(58) Field of Classification Search
CPC .............. H04B 10/2572; H04B 10/40; H04B 10/6971; H04B 3/23; H04Q 11/0067; H04Q 2213/1319
USPC .......................................................... 398/85
See application file for complete search history.

(56) References Cited

U.S. PATENT DOCUMENTS

| | | | | |
|---|---|---|---|---|
| 4,682,358 | A * | 7/1987 | Werner | H04B 3/232 379/406.08 |
| 6,912,209 | B1 * | 6/2005 | Thi et al. | H04B 3/23 370/286 |
| 2003/0123649 | A1 * | 7/2003 | Casper | H04B 3/23 379/406.01 |

(Continued)

*Primary Examiner* — Dalzid E Singh
(74) *Attorney, Agent, or Firm* — Lathrop GPM LLP

(57) ABSTRACT

An echo cancellation method includes steps of (a) extracting phase-distortion estimates, (b) reconstructing an echo signal, (c) generating a clean signal, and (d) producing a primary signal. Step (a) includes extracting, from a first phase signal, a plurality of phase-distortion estimates, the first phase signal having been estimated from an echo-corrupted signal received at a first coherent transceiver of a coherent optical network. Step (b) includes reconstructing an echo signal from the plurality of phase-distortion estimates and a transmitted signal transmitted by the first coherent transceiver. Step (c) includes generating a clean signal as a difference between the reconstructed echo signal and the first phase signal. Step (d) includes producing a primary signal by mapping each of a plurality of clean-phase estimates of the clean signal to one of a plurality of constellation symbols associated with a modulation scheme of the primary signal.

21 Claims, 6 Drawing Sheets

(56) References Cited

U.S. PATENT DOCUMENTS

2004/0213170 A1* 10/2004 Bremer ............... H04L 5/16
370/282
2018/0254927 A1* 9/2018 Yagil ............ H04L 25/03159

* cited by examiner

ECHO CANCELLATION SYSTEM AND METHOD

This application claims benefit of priority to U.S. Provisional Patent Application Ser. No. 62/844,379 filed May 7, 2019, and U.S. Provisional Patent Application Ser. No. 62/957,615 filed Jan. 6, 2020, each of which is incorporated herein by reference.

BACKGROUND

Coherent optical technology, widely used in long haul and metro as well as data center interconnections, is migrating closer to access networks to support growing demand for higher communication speed and better quality of service. Coherent detection for access networks enables superior receiver sensitivity that allows for extended power budget and more efficient utilization of spectral resources, which benefits future network upgrades. To reduce the power consumption and thereby meet the size and cost requirements for access applications, the optical industry is investing to develop low-complexity and cost-effective photonic systems.

Besides these efforts, there is also a growing need for bidirectional transmission over a single fiber in most existing operators' optical infrastructures to support single-fiber topologies, contain costs, and facilitate the redundancy for protecting optical links. These needs stimulate the study of full duplex coherent optics, which not only double the capacity of fiber in access networks but also reduce the requirements in the number of ports for bi-directionally operated devices.

Due to higher receiver sensitivity, coherent systems have increased tolerance for small-amplitude reflections and backscattering that result in echo signals, which corrupt the detection of primary signals detected concurrently with the echo signal. However, such small amplitudes can be assumed only in healthy optical distribution networks with angle-polished connectors. Causes of strong reflections include damaged fiber connections, aged devices, free-space wavelength-selective switches, and optical circulators operating at low-temperature. The influence becomes stronger when the back reflections occur where the received signals are relatively weak, such as the input/output ports of the transceivers. Mitigating optical reflections is important for extending the use case scenarios and relaxing link requirements for full-duplex coherent optics.

SUMMARY OF THE EMBODIMENTS

Embodiments disclosed herein enable accurate detection of primary signals by cancelling echoes. In a first aspect, an echo cancellation method includes steps of (a) extracting phase-distortion estimates, (b) reconstructing an echo signal, (c) generating a clean signal, and (d) producing a primary signal. Step (a) includes extracting, from a first phase signal, a plurality of phase-distortion estimates, the first phase signal having been estimated from an echo-corrupted signal received at a first coherent transceiver of a coherent optical network. Step (b) includes reconstructing an echo signal from the plurality of phase-distortion estimates and a transmitted signal transmitted by the first coherent transceiver. Step (c) includes generating a clean signal as a difference between the reconstructed echo signal and the first phase signal. Step (d) includes producing a primary signal by mapping each of a plurality of clean-phase estimates of the clean signal to one of a plurality of constellation symbols associated with a modulation scheme of the primary signal.

In a second aspect, an echo cancellation system includes a first decision decoder, a first subtractor circuit, a modulus equalizer, a phase-distortion estimator, a phase retriever, an adaptive filter, a second subtractor circuit, and a second decision decoder. The first decision decoder is configured to decode a first phase signal and output a decoded signal that includes a plurality of symbols each mapped from a respective one of a plurality of first phase-estimates of a first phase signal having been estimated from an echo-corrupted signal received at a first coherent transceiver of a coherent optical network. The first subtractor circuit is configured to generate an unequalized echo-interference-signal equal to a difference between the decoded signal and the first phase signal. The modulus equalizer is configured to process the unequalized echo-interference-signal by flattening its channel response to yield an equalized signal and an inverse channel-response function. The phase-distortion estimator is configured to estimate from the equalized signal, a plurality of phase-distortion estimates of a phase-distortion signal. The phase retriever is configured to retrieve a phase of either (i) a transmitted signal or (ii) a synchronized transmitted signal that is synchronized to the phase-distortion signal, to yield a phase-retrieved signal. The adaptive filter is configured to multiply the phase-retrieved signal by the channel-response function to yield the reconstructed echo signal. The second subtractor circuit is configured to generate a clean signal as a difference between the reconstructed echo signal and the first phase signal. The second decision decoder is configured to output a primary signal by mapping each of a plurality of clean-phase estimates of the clean signal to one of a plurality of constellation symbols associated with a modulation scheme of the primary signal.

DETAILED DESCRIPTION OF THE EMBODIMENTS

Figure 1:
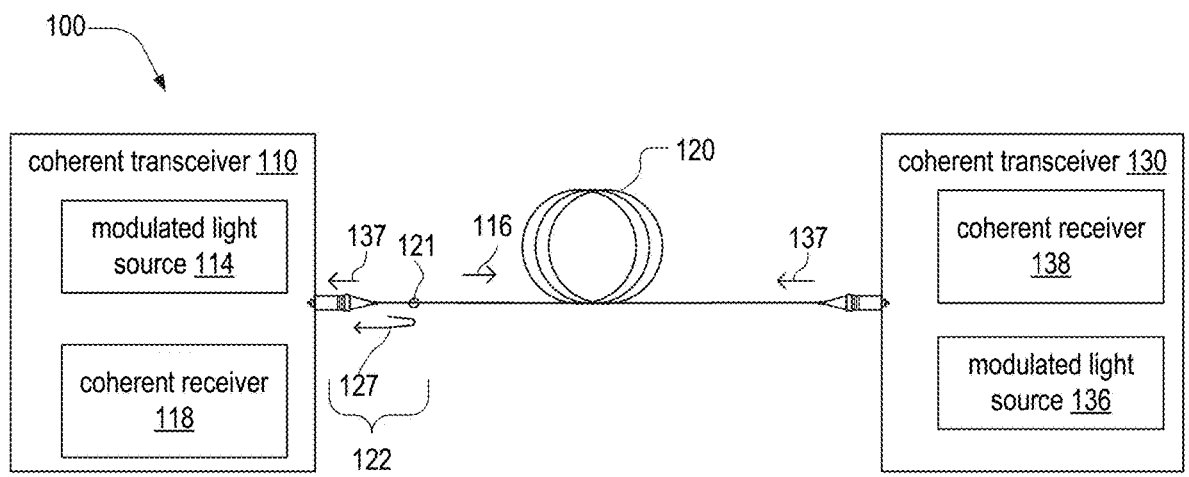
FIG. 1 schematically illustrates formation of an error-corrupted signal from echo interference in a coherent optical network.

FIG. 1 is a schematic illustration of echo interference occurring in a coherent optical network 100. Coherent optical network 100 includes coherent transceivers 110 and 130 and an optical fiber link 120, which communicatively couples coherent transceivers 110 and 130. Coherent transceiver 110 includes a modulated light source 114 and a coherent receiver 118. Coherent transceiver 130 includes a modulated light source 136 and a coherent receiver 138. Optical fiber link 120 includes a reflection point 121. Reflection point 121 may correspond to a dirty or damaged fiber connection, an aged splitter, or an optical circulator operating at a low operation temperature.

In the use scenario of FIG. 1, modulated light source 114 transmits a transmitted signal 116 to coherent transceiver 130 via optical fiber link 120. Modulated light source 136 transmits a primary signal 137 to coherent transceiver 110 via optical fiber link 120. Reflection point 121 reflects part of transmitted signal 116 is an echo signal 127. Coherent receiver 118 receives an echo-corrupted signal 122, which includes both primary signal 137 and echo signal 127.

Figure 2:
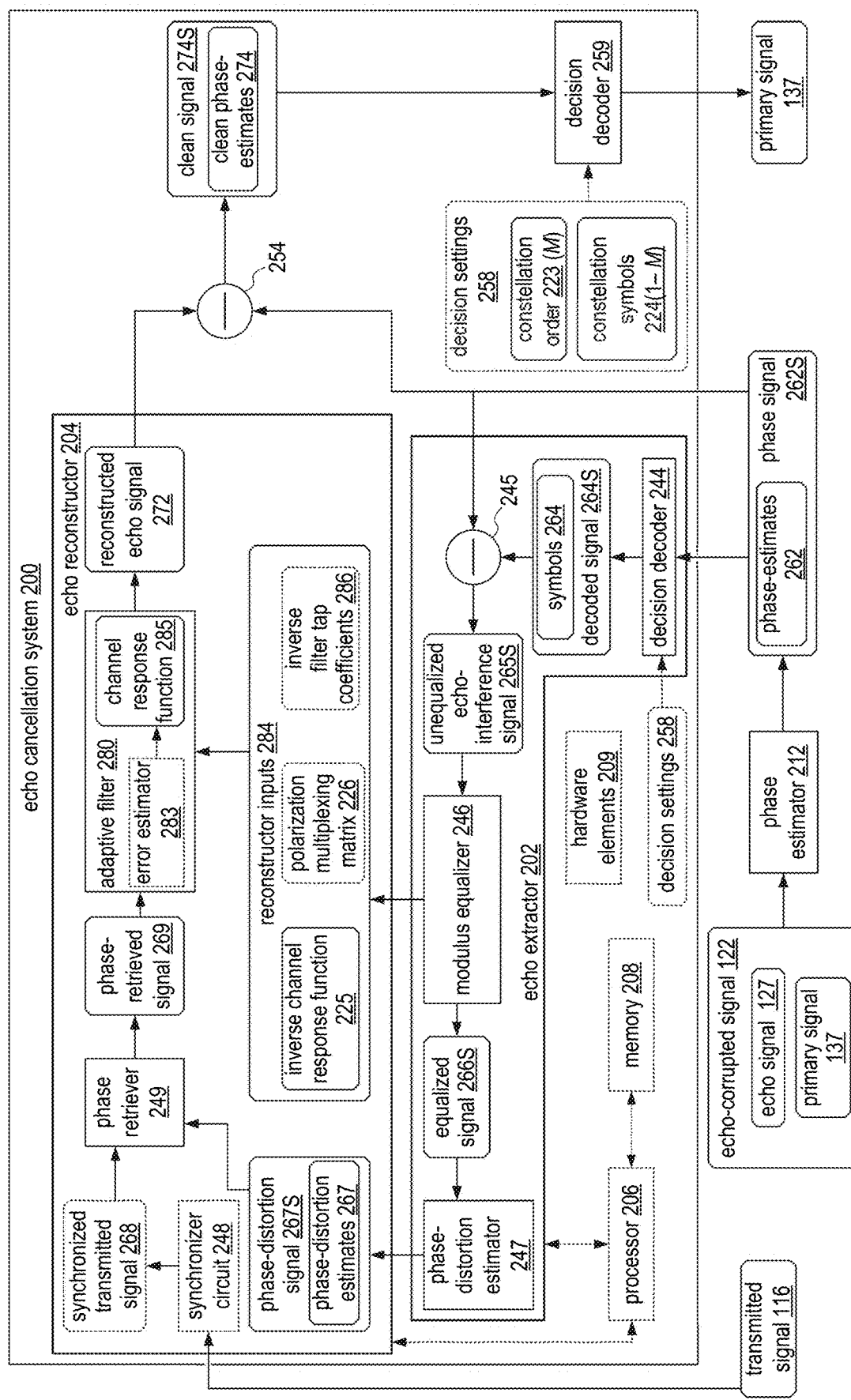
FIG. 2 is a schematic block diagram of an echo cancellation system configured to remove echo interference from the error-corrupted signal of FIG. 1, in an embodiment.

FIG. 2 is a schematic block diagram of an echo cancellation system 200, which is configured to extract primary signal 137 from echo-corrupted signal 122 received by coherent transceiver 110. Echo cancellation system 200 includes an echo extractor 202, an echo reconstructor 204, a subtractor circuit 254, and a decision decoder 259. In embodiments, echo cancellation system 200 includes at least one of a processor 206, and a memory 208. FIG. 2 includes a phase estimator 212, which estimates a phase signal 262S from echo-corrupted signal 122. Phase signal 262S includes a plurality of phase-estimates 262. In embodiments, phase estimator 212 is part of echo cancellation system 200.

In the process of extracting primary signal 137, echo cancellation system 200 produces several intermediate signals and other data, which may be stored in memory 208. Memory 208 represents one or both of volatile memory (e.g., RAM, DRAM, SRAM, and so on) and non-volatile or non-transitory memory such as FLASH, ROM, magnetic memory, magnetic disk, and other nonvolatile memory known in the computer art.

In embodiments, memory 208 stores at least one of decision settings 258, a decoded signal 264S, an unequalized echo-interference signal 265S, reconstructor inputs 284, an equalized signal 266S, a phase-distortion signal 267S, a synchronized transmitted signal 268, a phase-retrieved signal 269, a channel-response function 285, a reconstructed echo signal 272, and a clean signal 274S.

Decision settings 258 include a constellation order 223 (also denoted herein as M) and M constellation symbols 224(1, 2, . . . , M). Decoded signal 264S includes a plurality of symbols 264. Reconstructor inputs 284 include an inverse channel-response function 225 and may also include at least one of a polarization multiplexing matrix 226 and inverse filter-tap coefficients 286. Inverse channel-response function 225 is the inverse function of channel-response function 285. Phase-distortion signal 267S includes phase-distortion estimates 267. Clean signal 274S includes clean phase-estimates 274.

Echo extractor 202 includes the following functional components: a decision decoder 244, a subtractor circuit 245, a modulus equalizer 246, and a phase-distortion estimator 247. Echo reconstructor 204 includes the following functional components: a phase retriever 249, an adaptive filter 280, and, in embodiments, a synchronizer circuit 248. Adaptive filter 280 may include an error estimator 283.

In embodiments, echo cancellation system 200 includes a plurality of hardware elements 209 that implement the functionality of at least one of the aforementioned functional components. Examples of hardware elements 209 include application-specific integrated circuits (ASICs) and field-programmable gate arrays (FPGAs). In embodiments, hardware elements 209 include a dedicated hardware element that implements a single one of the above functional components. Hardware elements 209 may include more than one such dedicated hardware elements. In embodiments, hardware elements 209 include at least one non-dedicated hardware element that implements more than one of the above functional components. In embodiments, at least one of the following functional components is implemented by one or more hardware elements 209: decision decoder 244, subtractor circuits 245 and 254, modulus equalizer 246, phase-distortion estimator 247, synchronizer circuit 248, adaptive filter 280, and decision decoder 259. In embodiments, decision decoder 244 and decision decoder 259 are the same single decision decoder. In embodiments, subtractor circuits 245 and 254 are the same subtractor circuit.

In embodiments, memory 208 stores non-transitory computer-readable instructions that, when executed by processor 206, control processor 206 to implement the functionality of at least one of decision decoder 244, subtractor circuit 245, modulus equalizer 246, phase-distortion estimator 247, synchronizer circuit 248, phase retriever 249, adaptive filter 280, error estimator 283, subtractor circuit 254, and decision decoder 259.

Decision decoder 244 is configured to decode phase signal 262S and output decoded signal 264S. Decoded signal 264S includes the plurality of symbols 264 each mapped from a respective one of the plurality of phase-estimates 262. In embodiments, decoded signal 264S is a quadrature-amplitude modulated signal and each of the plurality of symbols 264 is a QAM symbol. In embodiments, decoded signal 264S is a phase-shift-keying modulated signal and each of the plurality of symbols 264 is a PSK symbol.

Subtractor circuit 245 is configured to generate unequalized echo-interference-signal 265S, which is equal to a difference between decoded signal 264S and phase signal 262S. Modulus equalizer 246 is configured to process (demodulate, for example) unequalized echo-interference-signal 265S by flattening its channel response to yield equalized signal 266S and inverse channel-response function 225. In embodiments, modulus equalizer 246 is or includes an adaptive filter, such as a two-by-two tap butterfly adaptive filter. In embodiments, modulus equalizer 246 is an electronic adaptive equalizer.

Phase-distortion estimator 247 is configured to output, from either unequalized signal 265S or equalized signal 266S, the plurality of phase-distortion estimates 267. In embodiments, phase-distortion estimator 247 applies at least one of a Viterbi-Viterbi Fourth-Power estimator and a blind phase search to either unequalized echo-interference-signal 265S or equalized echo-interference-signal 266S.

Phase retriever 249 configured to retrieve a phase of either (i) transmitted signal 116 or (ii) synchronized transmitted signal 268 that is synchronized to the phase-distortion signal 267S, to yield phase-retrieved signal 269. In embodiments, phase retriever 249 adds the plurality of phase-distortion estimates 267 to either transmitted signal 116 or synchronized transmitted signal 268 to yield phase-retrieved signal 269. In embodiments, echo cancellation system 200 includes a synchronizer circuit 248. Synchronizer circuit 248 is configured to synchronize transmitted signal 116 to phase-distortion signal 267S to yield synchronized transmitted signal 268. Such synchronization eliminates timing mismatch between transmitted signal 116 and phase-distortion signal 267S such that phase-distortion estimates 267 temporally align with the correct symbols of transmitted signal 116 when the processing is done by phase retriever 249.

Adaptive filter 280 is configured to multiply phase-retrieved signal 269 by channel-response function 285 to yield reconstructed echo signal 272. Subtractor circuit 254 is configured to generate clean signal 274S as a difference between reconstructed echo signal 272 and phase signal 262S. Decision decoder 259 is configured to output primary signal 137 by mapping each of the plurality of clean-phase estimates 274 of clean signal 274S to one of the plurality of constellation symbols 224 associated with a modulation scheme of primary signal 137.

Multiple pairs of functional elements of echo cancellation system 200 are communicatively coupled. In embodiments, first functional element of echo cancellation system 200 being communicatively coupled to a second functional element of echo cancellation system 200 means that the second functional element is configured to receive outputs of the first functional element. The communicative coupling may be bidirectional, in which case the first functional element is configured to receive outputs of the second functional element.

In embodiments, at least one of (a) decision decoder 244 is communicatively coupled to subtractor circuit 245; (b) subtractor circuit 245 is communicatively coupled to modulus equalizer 246; (c) modulus equalizer 246 is communicatively coupled to phase-distortion estimator 247; (d) phase-distortion estimator 247 is communicatively coupled to phase retriever 249; (e) phase retriever 249 is communicatively coupled to adaptive filter 280; (f) adaptive filter 280 is communicatively coupled to subtractor circuit 254; and (g) subtractor circuit 254 is communicatively coupled to decision decoder 259.

Figure 3:
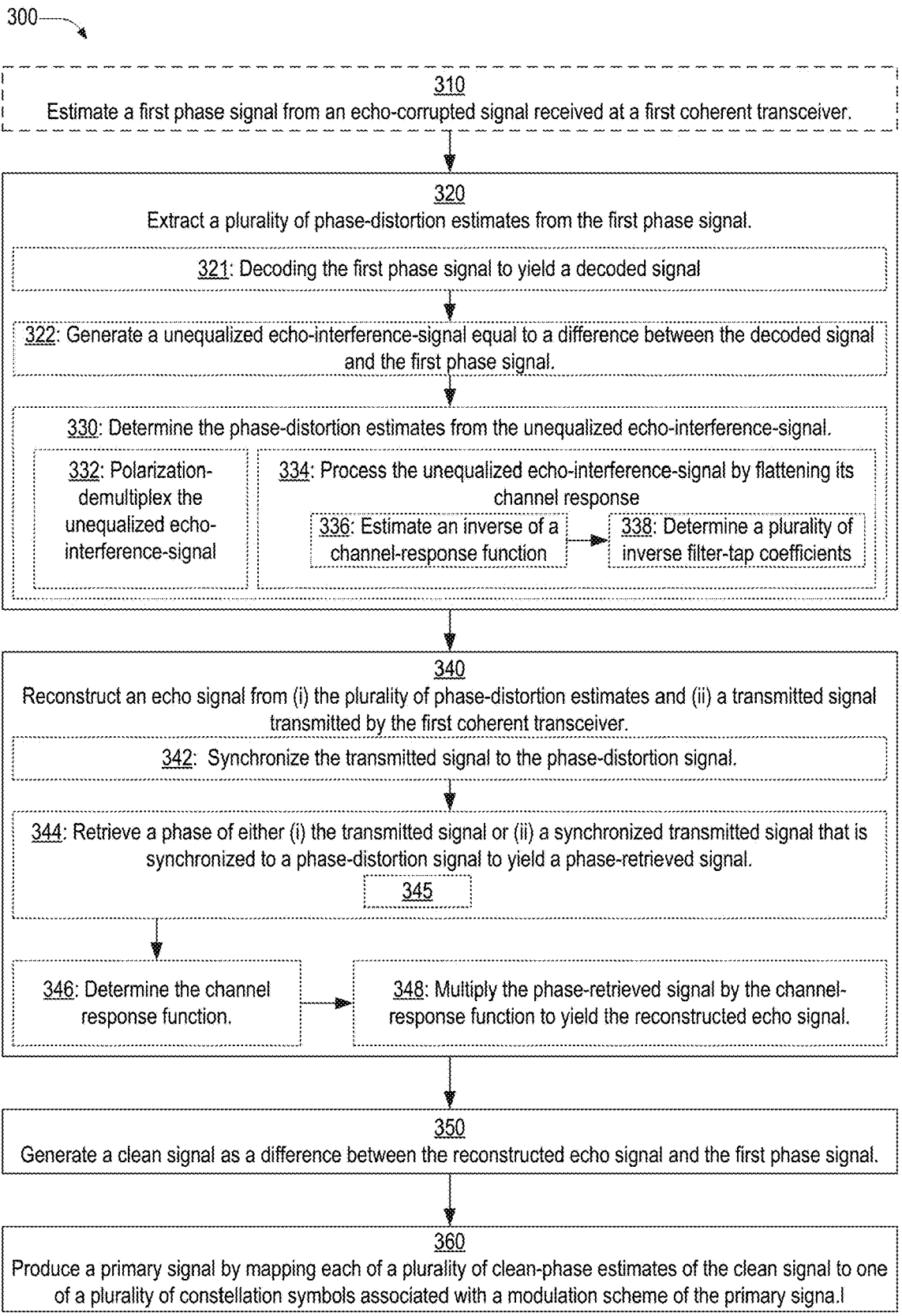
FIG. 3 is a flowchart illustrating an embodiment of an echo cancellation method, in an embodiment.

FIG. 3 is a flowchart illustrating an echo cancellation method 300. In embodiments, method 300 is implemented by echo cancellation system 200. Method 300 includes steps 320, 340, 350, and 360. In embodiments, method 300 also includes step 310.

Step 310 includes estimating a first phase signal from an echo-corrupted signal received at a coherent transceiver of a coherent optical network. In an example of step 310, phase estimator 212 estimates phase signal 262S from echo-corrupted signal 122 received at coherent transceiver 110 of coherent optical network 100. Step 320 includes extracting a plurality of phase-distortion estimates from the first phase signal. In example of step 320, echo extractor 202 extracts the plurality of phase-distortion estimates 267 from phase signal 262S.

In embodiments, step 320 includes at least one of steps 321, 322, and 330. Step 321 includes decoding the first phase signal to yield a decoded signal that includes a plurality of symbols each mapped from a respective one of a plurality of phase-estimates of the first phase signal. In an example of step 321, decision decoder 244 decodes first phase signal 262S to yield decoded signal 264S. Step 322 includes generating a unequalized echo-interference-signal equal to a difference between the decoded signal and the first phase signal. In an example of step 322, subtractor circuit 245 generates unequalized echo-interference-signal 265S, which equals a difference between decoded signal 264S and phase signal 262S.

Step 330 includes determining the plurality of phase-distortion estimates from the unequalized echo-interference-signal. In embodiments, step 330 includes applying one of a Viterbi-Viterbi Fourth-Power estimator and a blind phase search to the unequalized echo-interference-signal or a signal derived therefrom. In a first example of step 330, phase-distortion estimator 247 determines phase-distortion estimates 267 either directly or indirectly from unequalized echo-interference-signal 265S. In a second example of step 330, phase-distortion estimator 247 determines phase-distortion estimates 267 from equalized echo-interference-signal 266S, which is an example of phase-distortion estimator 247 determining estimates 267 indirectly from unequalized echo-interference-signal 265S.

In embodiments, step 330 includes at least one of steps 332 and 334. Step 332 includes polarization-demultiplexing the unequalized echo-interference-signal to yield a polarization multiplexing matrix. In an example of step 332, modulus equalizer 246 polarization-demultiplexes unequalized echo-interference-signal 265S to yield polarization multiplexing matrix 226. In embodiments, modulus equalizer 246 implements, either in hardware or software, a constant-modulus algorithm or a DD-LMS algorithm for polarization demultiplexing.

Step 334 includes processing the unequalized echo-interference-signal by flattening its channel response to yield an equalized signal and an inverse channel-response function that is the inverse of a channel-response function. In an example of step 334, modulus equalizer 246 processes unequalized echo-interference-signal 265S by flattening its channel response to yield equalized signal 266S and inverse channel-response function 225. When method 300 includes step 334, phase-distortion estimator 247 determines phase-distortion estimates 267 from unequalized echo-interference-signal 266S.

In embodiments, step 334 includes steps 336 and 338. Step 336 includes estimating the inverse channel-response function by applying at least a one of a constant-modulus algorithm, a constant multi-modulus algorithm, and a DD-LMS algorithm to the unequalized echo-interference-signal. In step 336, the equalized signal is equal to a sum of (i) the inverse channel-response function applied to the unequalized echo-interference-signal and (ii) an estimation error. In an example of step 336, modulus equalizer 246 estimates inverse channel-response function 225 by applying at least a one of a constant-modulus algorithm, a constant multi-modulus algorithm, and a decision-directed least mean-square (LMS) algorithm to unequalized echo-interference-signal 265S. In this example, equalized signal 266S is equal to a sum of (i) the inverse channel-response function 225 applied to the unequalized echo-interference-signal 265S and (ii) an estimation error.

Step 338 includes determining a plurality of inverse filter-tap coefficients. In an example of step 338, modulus equalizer 246 determines the plurality of inverse filter-tap coefficients 286 from unequalized echo-interference signal 265S.

Step 340 includes reconstructing an echo signal from (i) the plurality of phase-distortion estimates and (ii) a transmitted signal transmitted by the first coherent transceiver. In an example of step 340, echo reconstructor 204 generates reconstructed echo signal 272 from (i) the plurality of phase-distortion estimates 267 and (ii) transmitted signal 116.

In embodiments, step 340 includes at least one of steps 342, 344, 346, and 348. Step 342 includes synchronizing the transmitted signal to the phase-distortion signal to yield the synchronized transmitted signal. In an example of step 342, synchronizer circuit 248 synchronizes transmitted signal 116 to phase-distortion signal 267S to yield synchronized transmitted signal 268.

Step 344 includes retrieving a phase of either (i) the transmitted signal or (ii) a synchronized transmitted signal that is synchronized to a phase-distortion signal that includes the plurality of phase-distortion estimates, to yield a phase-retrieved signal. In an example of step 344, phase retriever 249 retrieves a phase of either (i) transmitted signal 116 or (ii) synchronized transmitted signal 268, to yield phase-retrieved signal 269.

In embodiments, step 344 includes step 345. Step 345 includes adding the plurality of phase-distortion estimates to one of transmitted signal and the synchronized transmitted signal to yield a phase-retrieved signal. In an example of step 345, phase retriever 249 adds the plurality of phase-distortion estimates 267 to one of transmitted signal 116 and synchronized transmitted signal 268 to yield phase-retrieved signal 269.

Step 346 includes (a) initializing an error estimator with the plurality of inverse filter-tap coefficients and (b) with the error estimator, determining the channel-response function. In an example of step 346, adaptive filter 280 initializes error estimator 283 with inverse filter-tap coefficients 286 and error estimator 283 determines channel-response function 285. In embodiments, error estimator 283 is configured to implement, in step 346 for example, at least one of a decision-directed least mean-square (DD-LMS) algorithm, a polynomial error estimator, a Volterra LMS filter, and a minimal mean-square error estimation.

Step 348 includes multiplying the phase-retrieved signal by the channel-response function to yield the reconstructed echo signal. In an example of step 348, adaptive filter 280 multiplies phase-retrieved signal 269 by channel-response function 285 to yield reconstructed echo signal 272.

Step 350 includes generating a clean signal as a difference between the reconstructed echo signal, or a signal derived therefrom, and the first phase 262S. In an example of step 350, subtractor circuit 254 generates a clean signal 274S as a difference between reconstructed echo signal 272 and phase signal 262S.

Step 360 includes producing a primary signal by mapping each of a plurality of clean-phase estimates of the clean signal to one of a plurality of constellation symbols associated with a modulation scheme of the primary signal. In an example of step 360, decision decoder 259 produces primary signal 137 by mapping each of the plurality of clean-phase estimates 274 of clean signal 274S to one of a plurality of constellation symbols 224 associated with a modulation scheme of primary signal 137.

Method 300 may further include determining an amplitude of a phase-distortion signal (signal 267S, for example) that includes the plurality of phase-distortion estimates (estimates 267, for example); and executing steps 340m 350, and 360 when the amplitude exceeds a predetermined threshold.

FIGS. 4-10 illustrate simulation results that validate the performance of echo cancellation system 200 and echo cancellation method 300. In each of FIGS. 4-10, the modulation format used in both downlink and uplink signals is 32-GBd dual-polarization quadrature phase shift keying (DP-QPSK). The main signal is coming from downlink transmission while the echo is from the reflected uplink transmission. The main signal and echo are examples of primary signal 137 and echo signal 127 respectively. The downlink and uplink signals are independently different, and reflection point 121 is set five meters away from coherent receiver 110, which in this example is located at a network hub. The SNR in each of plots 4-10 is 25 dB.

Figure 4:
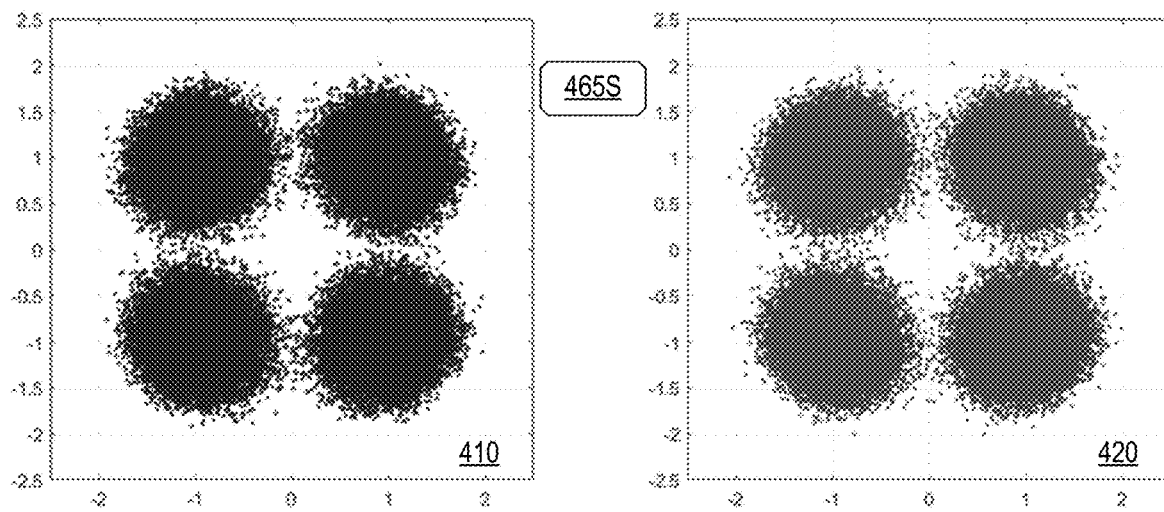
FIG. 4 includes two constellation diagrams of an example unequalized echo-interference signal.
Figure 5:
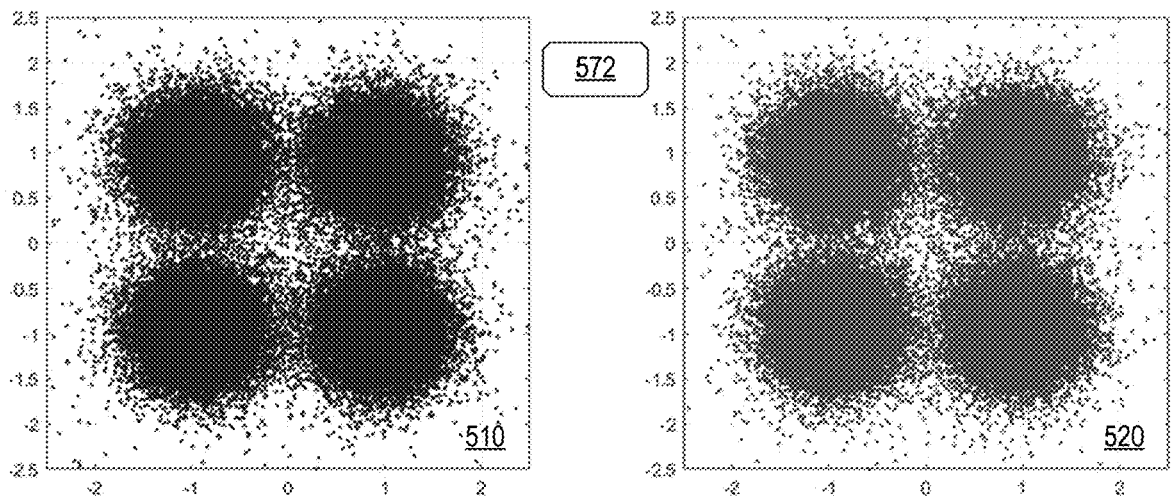
FIG. 5 includes two constellation diagrams of the unequalized echo-interference signal of FIG. 4 after demodulation, in an embodiment.
Figure 6:
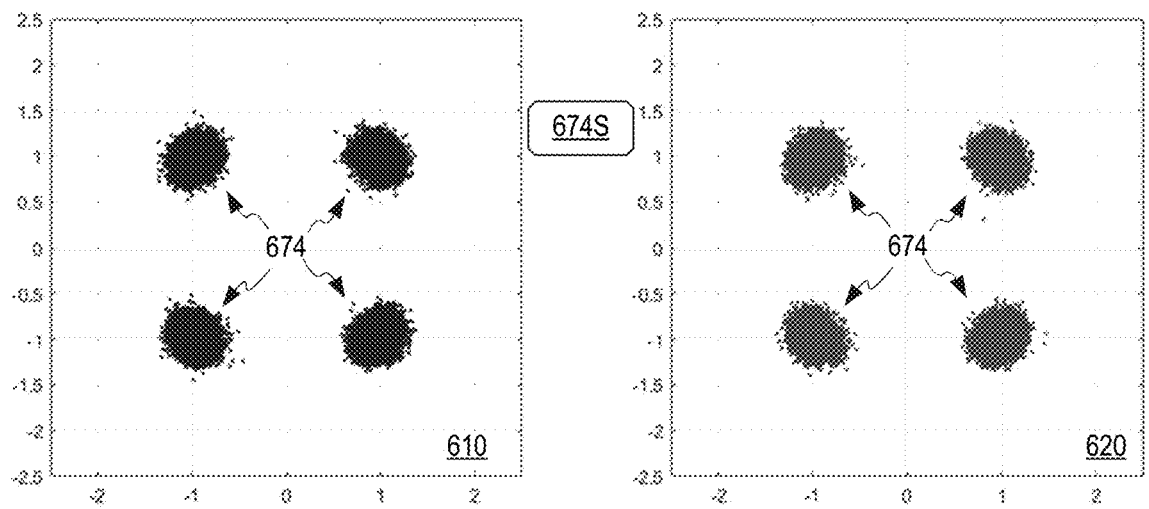
FIG. 6 includes two constellation diagrams of the demodulated echo-interference signal of FIG. 6 after echo cancellation per the echo cancellation system of FIG. 2, in an embodiment.

FIGS. 4-6 include respective constellation diagrams 410, 510, and 610, which correspond to horizontally-polarized signal components. FIGS. 4-6 also include respective constellation diagrams 420, 520, and 620, which correspond to vertically-polarized signal components.

Constellation diagrams 410 and 420 are of an unequalized echo-interference signal 465S, which is an example of unequalized echo-interference signal 265S, FIG. 2. Constellation diagrams 410 and 420 each include a plurality of constellation symbols, the error vector magnitude (EVM) of which is 31.1%. Constellation diagrams 510 and 520 are of a signal 572, which is unequalized echo-interference signal 465S after demodulation. Signal 572 is an example of reconstructed echo signal 272, FIG. 2. Constellation diagrams 510 and 520 each include a plurality of constellation symbols, the error vector magnitude (EVM) of which is 35.3%. Constellation diagrams 610 and 620 includes a plurality of phase-estimates 674 of a coherent signal 674S. Coherent signal 674S is signal 572 after echo cancellation, and is an example of clean signal 274S. Phase-estimates 674 are examples of clean phase-estimates 274. The error vector magnitude of phase-estimates 674 is 10.3%.

Figure 7:
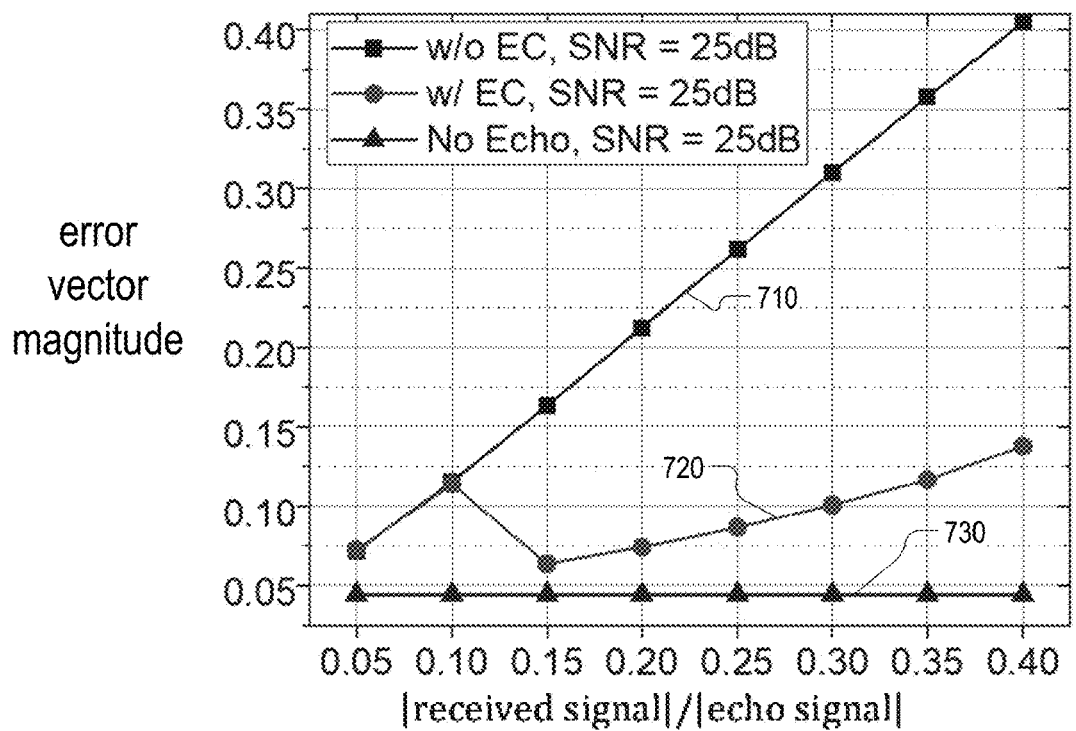
FIG. 7 compares error vector magnitude as a function of received-signal-to-echo ratio for a signal with and without echo-cancellation disclosed herein, in an embodiment.

FIG. 7 is a plot of error vector magnitude as a function of received-signal-to-echo ratio (RSER). RSER is ratio of the magnitude of the received signal, such as primary signal 137, to the magnitude of the echo signal, such as echo signal 127. FIG. 7 includes three EVM curves 710, 720, and 730 that have data points denoted by squares, circles, and triangles, respectively. Data points of EVM curves 710, 720, and 730 denote EVM values with no echo cancellation, with echo cancellation disclosed herein, and with no echo, respectively. For RSER values greater than or equal to 0.15, the error vector magnitudes of EVM curve 720 (with echo cancellation) are closer to those of the no-echo case (EVM curve 730) than to those of the EVM curve 710 (no echo cancellation).

Figure 8:
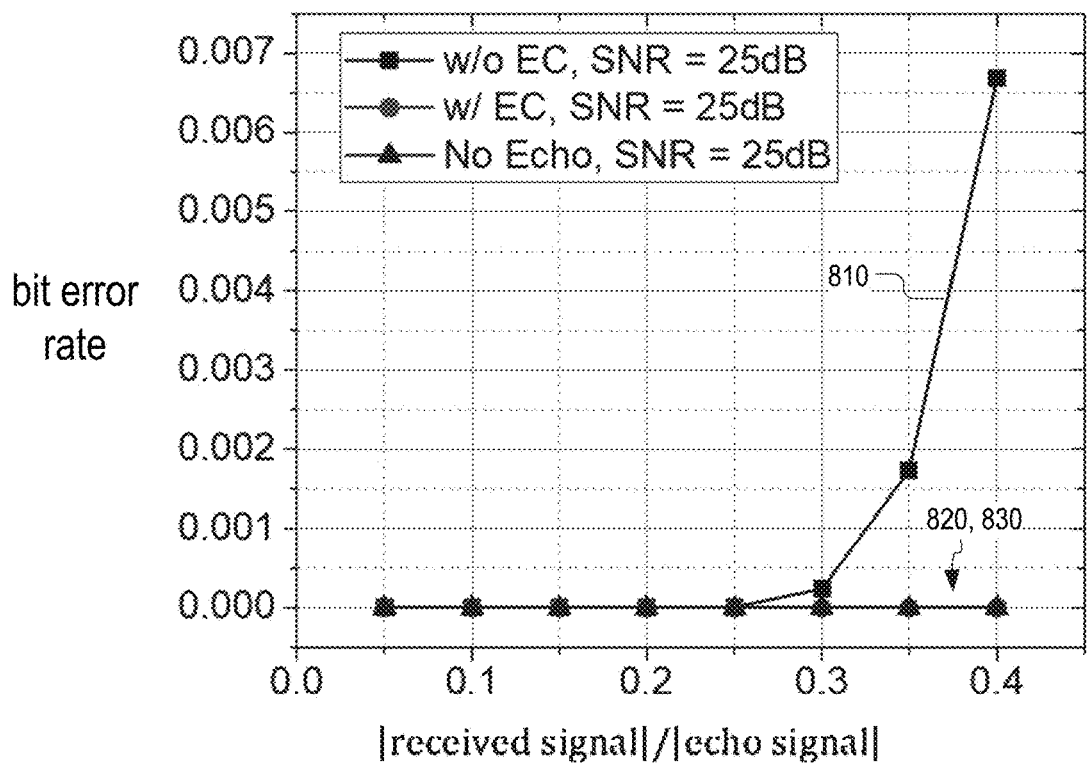
FIG. 8 compares bit error rate as a function of received-signal-to-echo ratio for a signal with and without echo-cancellation disclosed herein, in an embodiment.

FIG. 8 is a plot bit error rate (BER) as a function of RSER. FIG. 8 includes three BER curves 810, 820, and 830 that have data points denoted by squares, circles, and triangles, respectively. Data points of BER curves 810, 820, and 830 denote BER values with no echo cancellation, with echo cancellation disclosed herein, and with no echo, respectively. For all plotted BER values, the error rates of BER curve 820 (with echo cancellation) are closer to those of the no-echo case (BER curve 830) than to those of the BER curve 810 (no echo cancellation).

Figure 9:
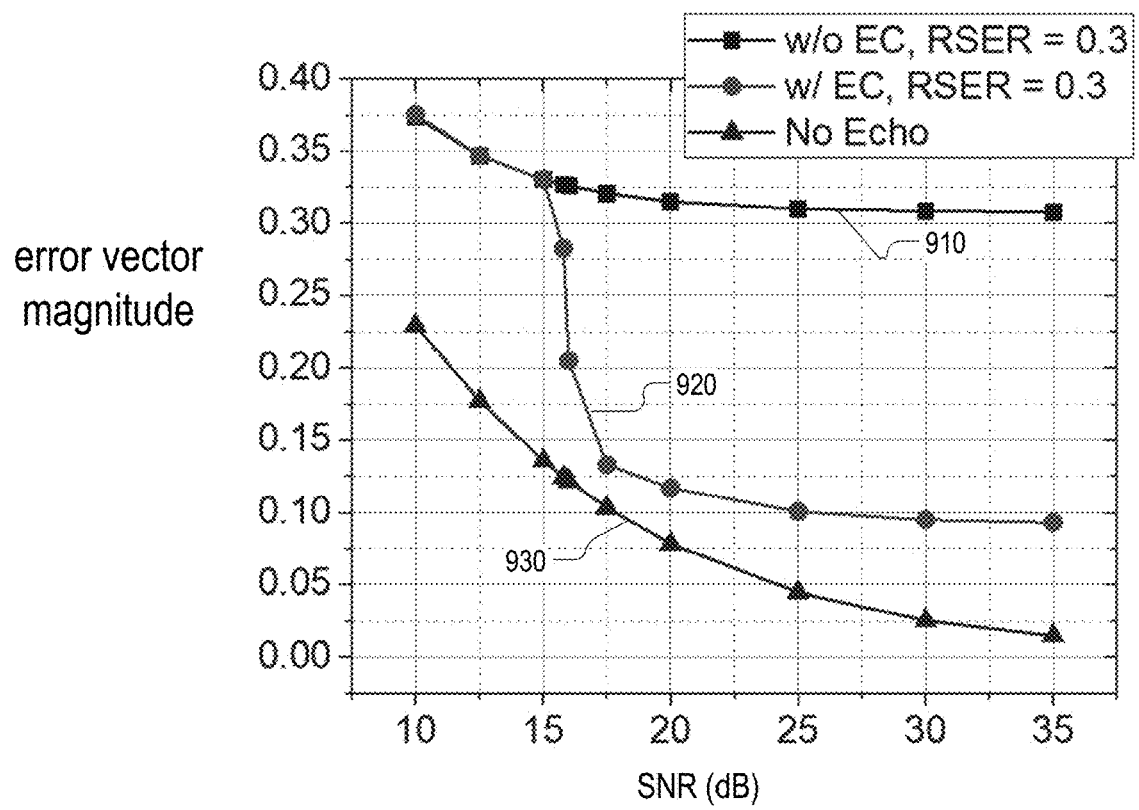
FIG. 9 compares error vector magnitude as a function of signal-to-noise ratio for a signal with and without echo-cancellation disclosed herein, in an embodiment.

FIG. 9 is a plot of error vector magnitude as a function of signal-to-noise ratio (SNR), where RSER is fixed at 0.3. FIG. 9 includes three EVM curves 910, 920, and 930 that have data points denoted by squares, circles, and triangles, respectively. Data points of EVM curves 910, 920, and 930 denote EVM values with no echo cancellation, with echo cancellation disclosed herein, and with no echo, respectively. For SNR values greater than approximately 16 dB, the error vector magnitudes of EVM curve 920 (with echo cancellation) are closer to those of the no-echo case (EVM curve 930) than to those of the EVM curve 910 (no echo cancellation).

Figure 10:
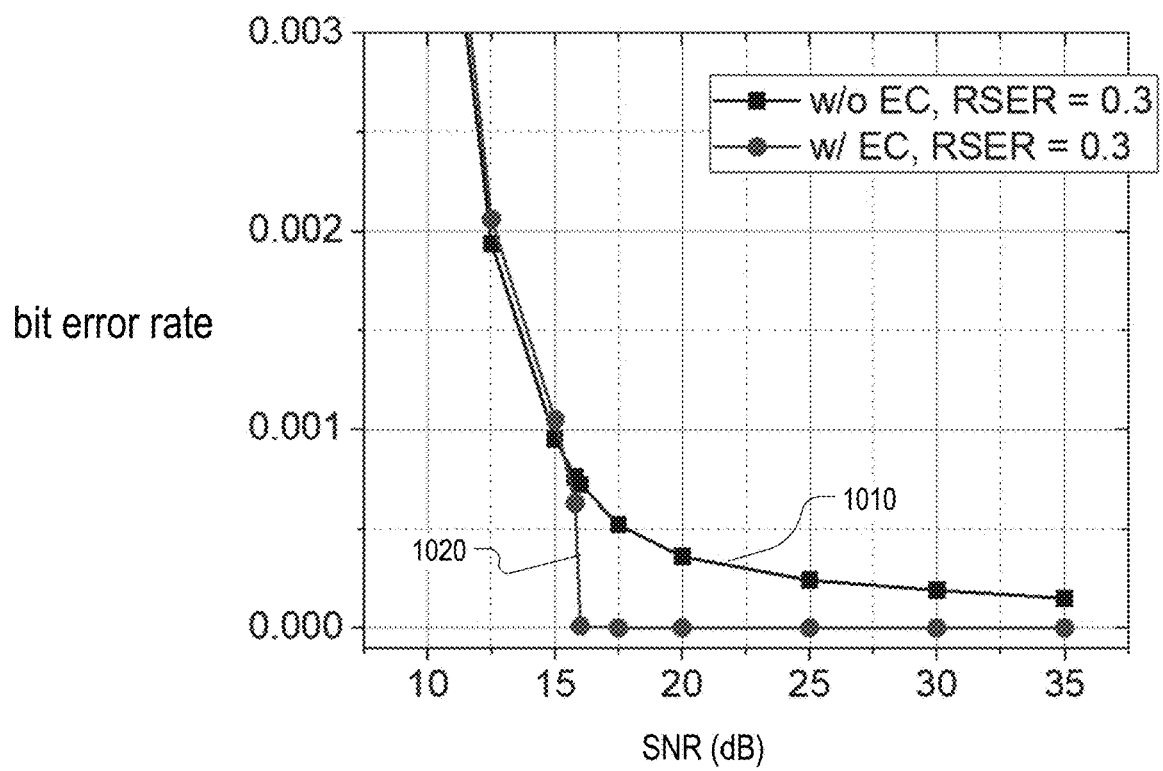
FIG. 10 compares bit error rate as a function of signal-to-noise ratio for a signal with and without echo-cancellation disclosed herein, in an embodiment.

FIG. 10 is a plot bit-error rate (BER) as a function of SNR, where RSER is again fixed at 0.3. FIG. 10 includes two BER curves 1010 and 1020 that have data points denoted by squares and circles, respectively. Data points of BER curves 1010 and 1020 denote BER values with no echo cancellation and with echo cancellation disclosed herein, respectively.

For BER values greater than approximately 16 dB, the error rates of BER curve 1020 (with echo cancellation) are less than those of BER curve 1010 (no echo cancellation).

In embodiments pertaining to FIGS. 5-10, when SNR is lower than approximately 16 dB, echo cancellation provides little or no performance gain because the echo cancellation system cannot recover the echo signal effectively due to the low SNR and strong interference from the main signal. When SNR equals or exceeds 16 dB, implementing the echo cancellation system/methods results in a large performance gain in both EVM and BER.

Combinations of Features (A1) An echo cancellation method includes steps of (a) extracting phase-distortion estimates, (b) reconstructing an echo signal, (c) generating a clean signal, and (d) producing a primary signal. Step (a) includes extracting, from a first phase signal, a plurality of phase-distortion estimates, the first phase signal having been estimated from an echo-corrupted signal received at a first coherent transceiver of a coherent optical network. Step (b) includes reconstructing an echo signal from the plurality of phase-distortion estimates and a transmitted signal transmitted by the first coherent transceiver. Step (c) includes generating a clean signal as a difference between the reconstructed echo signal and the first phase signal. Step (d) includes producing a primary signal by mapping each of a plurality of clean-phase estimates of the clean signal to one of a plurality of constellation symbols associated with a modulation scheme of the primary signal.

(A2) In method (A1) extracting the plurality of phase-distortion estimates may include: decoding the first phase signal to yield a decoded signal that includes a plurality of symbols each mapped from a respective one of a plurality of first phase-estimates of the first phase signal; generating a unequalized echo-interference-signal equal to a difference between the decoded signal and the first phase signal; and determining the plurality of phase-distortion estimates from the unequalized echo-interference-signal.

(A3) In method (A2), the decoded signal may be one of a quadrature-amplitude modulated signal and a phase-shift-keying modulated signal.

(A4) In either of methods (A2) and (A3), the step of determining the plurality of phase-distortion estimates may include: applying one of a Viterbi-Viterbi Fourth-Power estimator and a blind phase search to the unequalized echo-interference-signal or a signal derived therefrom.

(A5) In any of methods (A2)-(A4), determining the plurality of phase-distortion estimates may further include processing the unequalized echo-interference-signal by flattening its channel response to yield an equalized signal and an inverse channel-response function that is the inverse of a channel-response function. Also, reconstructing the echo signal may further include retrieving a phase of either (i) the transmitted signal or (ii) a synchronized transmitted signal that is synchronized to a phase-distortion signal that includes the plurality of phase-distortion estimates, to yield a phase-retrieved signal; and multiplying the phase-retrieved signal by the channel-response function to yield the reconstructed echo signal.

(A6) In method (A5), flattening may include estimating the inverse channel-response function by applying at least a one of a constant-modulus algorithm, a constant multi-modulus algorithm, and a decision-directed least mean-square algorithm to the unequalized echo-interference-signal, the equalized signal being equal to a sum of (i) the inverse channel-response function applied to the unequalized echo-interference-signal and (ii) an estimation error.

(A7) In either of methods (A5) and (A6), multiplying may be executed by an adaptive filter.

(A8) In any of methods (A5)-(A7), retrieving may include adding the plurality of phase-distortion estimates to one of transmitted signal and the synchronized transmitted signal to yield a phase-retrieved signal.

(A9) Any of methods (A5)-(A8) may further include synchronizing the transmitted signal to the phase-distortion signal to yield the synchronized transmitted signal.

(A10) In any of methods (A5)-(A9) processing may further include determining a plurality of inverse filter-tap coefficients; and reconstructing the echo signal may further include: (a) initializing an error estimator with the plurality of inverse filter-tap coefficients and (b) with the error estimator, determining the channel-response function.

(A11) In method (A10), the error estimator may be configured to implement one of a decision-directed least mean-square algorithm, a polynomial error estimator, a Volterra LMS filter, and a minimal mean-square error estimation.

(A12) In any of methods (A5)-(A11), determining may further include polarization-demultiplexing the unequalized echo-interference-signal to yield a polarization multiplexing matrix; and reconstructing the echo signal may further include multiplying the phase-retrieved signal by the polarization multiplexing matrix.

(A13) Any of methods (A1)-(A12) may further include determining an amplitude of a phase-distortion signal that includes the plurality of phase-distortion estimates; and executing the steps of reconstructing the echo signal, generating the clean signal, and mapping only when the amplitude exceeds a predetermined threshold.

(A14) Any of methods (A1)-(A13) may further include estimating the first phase signal from the echo-corrupted signal.

(B1) An echo cancellation system includes a first decision decoder, a first subtractor circuit, a modulus equalizer, a phase-distortion estimator, a phase retriever, an adaptive filter, a second subtractor circuit, and a second decision decoder. The first decision decoder is configured to decode a first phase signal and output a decoded signal that includes a plurality of symbols each mapped from a respective one of a plurality of first phase-estimates of a first phase signal having been estimated from an echo-corrupted signal received at a first coherent transceiver of a coherent optical network. The first subtractor circuit is configured to generate an unequalized echo-interference-signal equal to a difference between the decoded signal and the first phase signal. The modulus equalizer is configured to process the unequalized echo-interference-signal by flattening its channel response to yield an equalized signal and an inverse channel-response function. The phase-distortion estimator is configured to estimate from the equalized signal, a plurality of phase-distortion estimates of a phase-distortion signal. The phase retriever is configured to retrieve a phase of either (i) a transmitted signal or (ii) a synchronized transmitted signal that is synchronized to the phase-distortion signal, to yield a phase-retrieved signal. The adaptive filter is configured to multiply the phase-retrieved signal by the channel-response function to yield the reconstructed echo signal. The second subtractor circuit is configured to generate a clean signal as a difference between the reconstructed echo signal and the first phase signal. The second decision decoder is configured to output a primary signal by mapping each of a plurality of clean-phase estimates of the clean signal to one of a plurality of constellation symbols associated with a modulation scheme of the primary signal.

(B2) Echo cancellation system (B1) may further include at least one of (i) an application-specific integration circuit and (ii) a field-programmable gate array configured to implement the functionality of at least one of the first decision decoder, the first subtractor circuit, the modulus equalizer, the phase-distortion estimator, the adaptive filter, the second subtractor circuit, and the second decision decoder.

(B3) In either of echo cancellation system (B1) and (B2), the first decision decoder may be communicatively coupled to the first subtractor circuit; the modulus equalizer may be communicatively coupled to the phase-distortion estimator; the phase-distortion estimator may be communicatively coupled to the phase retriever; the phase retriever may be communicatively coupled to the adaptive filter; the adaptive filter may be communicatively coupled to the second subtractor circuit; and second subtractor circuit may be communicatively coupled to the second decision decoder.

(B4) In any of echo cancellation systems (B1)-(B3), the modulus equalizer may include an adaptive filter. The adaptive filter may be a two-by-two tap butterfly adaptive filter.

(B5) Any of echo cancellation systems (B1)-(B4) may further include a synchronizer circuit configured to synchronize the transmitted signal to the phase-distortion signal to yield the synchronized transmitted signal.

(B6) Any of echo cancellation systems (B1)-(B5) may further include a processor and memory. The processor is coupled to an output port of the first coherent transceiver. The memory stores non-transitory computer-readable instructions that, when executed by the processor, control the processor to implement the functionality of at least one of the first decision decoder, the first subtractor circuit, the modulus equalizer, the phase-distortion estimator, the synchronizer circuit, the phase retriever, the adaptive filter, the second subtractor circuit, and the second decision decoder.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. An echo cancellation method comprising:
    extracting, from a first phase signal, a plurality of phase-distortion estimates, the first phase signal having been estimated from an echo-corrupted signal received at a first coherent transceiver of a coherent optical network;
    reconstructing an echo signal from (i) the plurality of phase-distortion estimates and (ii) a transmitted signal transmitted by the first coherent transceiver;
    generating a clean signal as a difference between the reconstructed echo signal and the first phase signal; and
    producing a primary signal by mapping each of a plurality of clean-phase estimates of the clean signal to one of a plurality of constellation symbols associated with a modulation scheme of the primary signal.

2. The method of claim 1, extracting the plurality of phase-distortion estimates comprising:
    decoding the first phase signal to yield a decoded signal that includes a plurality of symbols each mapped from a respective one of a plurality of first phase-estimates of the first phase signal;
    generating a unequalized echo-interference-signal equal to a difference between the decoded signal and the first phase signal; and
    determining the plurality of phase-distortion estimates from the unequalized echo-interference-signal.

3. The method of claim 2, the decoded signal being one of a quadrature-amplitude modulated signal and a phase-shift-keying modulated signal.

4. The method of claim 2, the step of determining the plurality of phase-distortion estimates comprising: applying one of a Viterbi-Viterbi Fourth-Power estimator and a blind phase search to the unequalized echo-interference-signal or a signal derived therefrom.

5. The method of claim 2,
    determining the plurality of phase-distortion estimates further comprising:
        processing the unequalized echo-interference-signal by flattening its channel response to yield an equalized signal and an inverse channel-response function that is the inverse of a channel-response function; and
    reconstructing the echo signal comprising:
        retrieving a phase of either (i) the transmitted signal or (ii) a synchronized transmitted signal that is synchronized to a phase-distortion signal that includes the plurality of phase-distortion estimates, to yield a phase-retrieved signal; and
        multiplying the phase-retrieved signal by the channel-response function to yield the reconstructed echo signal.

6. The method of claim 5, flatting comprising
    estimating the inverse channel-response function by applying at least a one of a constant-modulus algorithm, a constant multi-modulus algorithm, and a decision-directed least mean-square algorithm to the unequalized echo-interference-signal, the equalized signal being equal to a sum of (i) the inverse channel-response function applied to the unequalized echo-interference-signal and (ii) an estimation error.

7. The method of claim 5, multiplying being executed by an adaptive filter.

8. The method of claim 5, retrieving comprising adding the plurality of phase-distortion estimates to one of transmitted signal and the synchronized transmitted signal to yield a phase-retrieved signal.

9. The method of claim 5, further comprising synchronizing the transmitted signal to the phase-distortion signal to yield the synchronized transmitted signal.

10. The method of claim 5,
    processing further comprising determining a plurality of inverse filter-tap coefficients; and
    reconstructing the echo signal further comprising: (a) initializing an error estimator with the plurality of inverse filter-tap coefficients and (b) with the error estimator, determining the channel-response function.

11. The method of claim 10, the error estimator being configured to implement one of a decision-directed least mean-square algorithm, a polynomial error estimator, a Volterra LMS filter, and a minimal mean-square error estimation.

12. The method of claim 5,
    determining further comprising polarization-demultiplexing the unequalized echo-interference-signal to yield a polarization multiplexing matrix; and reconstructing the echo signal further comprising multiplying the phase-retrieved signal by the polarization multiplexing matrix.

13. The method of claim 1, further comprising:
determining an amplitude of a phase-distortion signal that includes the plurality of phase-distortion estimates; and
executing the steps of reconstructing the echo signal, generating the clean signal, and mapping only when the amplitude exceeds a predetermined threshold.

14. The method of claim 1, further comprising: estimating the first phase signal from the echo-corrupted signal.

15. An echo cancellation system comprising:
a first decision decoder configured to decode a first phase signal and output a decoded signal that includes a plurality of symbols each mapped from a respective one of a plurality of first phase-estimates of a first phase signal having been estimated from an echo-corrupted signal received at a first coherent transceiver of a coherent optical network;
a first subtractor circuit configured to generate an unequalized echo-interference-signal equal to a difference between the decoded signal and the first phase signal;
a modulus equalizer configured to process the unequalized echo-interference-signal by flattening its channel response to yield an equalized signal and an inverse channel-response function;
a phase-distortion estimator configured to estimate from the equalized signal, a plurality of phase-distortion estimates of a phase-distortion signal;
a phase retriever configured to retrieve a phase of either (i) a transmitted signal or (ii) a synchronized transmitted signal that is synchronized to the phase-distortion signal, to yield a phase-retrieved signal;
an adaptive filter configured to multiply the phase-retrieved signal by the channel-response function to yield the reconstructed echo signal;
a second subtractor circuit configured to generate a clean signal as a difference between the reconstructed echo signal and the first phase signal; and
a second decision decoder configured to output a primary signal by mapping each of a plurality of clean-phase estimates of the clean signal to one of a plurality of constellation symbols associated with a modulation scheme of the primary signal.

16. The echo cancellation system of claim 15, further comprising at least one of (i) an application-specific integration circuit and (ii) a field-programmable gate array configured to implement the functionality of at least one of the first decision decoder, the first subtractor circuit, the modulus equalizer, the phase-distortion estimator, the adaptive filter, the second subtractor circuit, and the second decision decoder.

17. The echo cancellation system of claim 15,
the first decision decoder being communicatively coupled to the first subtractor circuit;
the modulus equalizer being communicatively coupled to the phase-distortion estimator;
the phase-distortion estimator being communicatively coupled to the phase retriever;
the phase retriever being communicatively coupled to the adaptive filter;
the adaptive filter being communicatively coupled to the second subtractor circuit; and
second subtractor circuit being communicatively coupled to the second decision decoder.

18. The echo cancellation system of claim 15, the modulus equalizer including an adaptive filter.

19. The echo cancellation system of claim 18, the adaptive filter being a two-by-two tap butterfly adaptive filter.

20. The echo cancellation system of claim 15, further comprising a synchronizer circuit configured to synchronize the transmitted signal to the phase-distortion signal to yield the synchronized transmitted signal.

21. The echo cancellation system of claim 15, further comprising:
a processor coupled to an output port of the first coherent transceiver; and
memory storing non-transitory computer-readable instructions that, when executed by the processor, control the processor to implement the functionality of at least one of the first decision decoder, the first subtractor circuit, the modulus equalizer, the phase-distortion estimator, the synchronizer circuit, the phase retriever, the adaptive filter, the second subtractor circuit, and the second decision decoder.

* * * * *